United States Patent
Rhoden et al.

(10) Patent No.: US 10,883,423 B2
(45) Date of Patent: Jan. 5, 2021

(54) TWO STAGE OXYGEN REMOVAL FOR GAS TURBINE ENGINE FUEL SYSTEM

(71) Applicant: Hamilton Sundstrand Corporation, Charlotte, NC (US)

(72) Inventors: William E. Rhoden, Glastonbury, CT (US); Peter J. Padykula, Brimfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 431 days.

(21) Appl. No.: 15/789,252

(22) Filed: Oct. 20, 2017

(65) Prior Publication Data
US 2019/0120142 A1 Apr. 25, 2019

(51) Int. Cl.
| | | |
|---|---|---|
| *F02C 7/00* | (2006.01) | |
| *F02C 7/236* | (2006.01) | |
| *F02C 7/232* | (2006.01) | |
| *B01D 53/22* | (2006.01) | |
| *B64D 37/00* | (2006.01) | |
| *F02C 7/22* | (2006.01) | |
| *F02C 9/36* | (2006.01) | |

(52) U.S. Cl.
CPC ............ *F02C 7/236* (2013.01); *B01D 53/22* (2013.01); *B64D 37/005* (2013.01); *F02C 7/22* (2013.01); *F02C 7/232* (2013.01); *F02C 9/36* (2013.01); *F05D 2220/323* (2013.01); *F05D 2240/35* (2013.01); *F05D 2260/60* (2013.01); *F05D 2270/11* (2013.01); *F23K 2900/05082* (2013.01)

(58) Field of Classification Search
None
See application file for complete search history.

(56) References Cited

U.S. PATENT DOCUMENTS

| | | | | |
|---|---|---|---|---|
| 3,732,668 A | * | 5/1973 | Nichols | ............... B64D 37/32 96/174 |
| 3,841,089 A | * | 10/1974 | Clark | ................. F02C 7/232 60/39.094 |
| 6,315,815 B1 | | 11/2001 | Spadaccini et al. | |
| 9,687,773 B2 | | 6/2017 | Johnson et al. | |
| 2003/0074884 A1 | * | 4/2003 | Snow | ................. F02C 7/236 60/204 |

(Continued)

OTHER PUBLICATIONS

European Search Report for EP Application No. 18201792.1 dated Feb. 22, 2019.

*Primary Examiner* — Todd E Manahan
*Assistant Examiner* — Edwin Kang
(74) *Attorney, Agent, or Firm* — Carlson, Gaskey & Olds, P.C.

(57) ABSTRACT

A fuel supply system has a fuel tank, a first fuel pump, and a first oxygen removal unit. The first fuel pump delivers fuel from the fuel tank into the first oxygen removal unit. A valve downstream of the first oxygen removal unit is operable to selectively deliver fuel back to the fuel tank in a bypass position or downstream to a use in a use position. A controller programmed to control the valve and the first fuel pump maintains the valve in the bypass position when an associated gas turbine engine is not operating. The controller moves the valve to the use position when the associated gas turbine engine is operating. A gas turbine engine and a method of operating a fuel supply system are also disclosed.

16 Claims, 2 Drawing Sheets

(56) References Cited

U.S. PATENT DOCUMENTS

| | | | |
|---|---|---|---|
| 2003/0113676 A1* | 6/2003 | Mitchell | F23K 5/04 |
| | | | 431/29 |
| 2006/0263277 A1 | 11/2006 | Tillman et al. | |
| 2007/0163439 A1* | 7/2007 | Coffin | B01D 19/0031 |
| | | | 96/6 |
| 2008/0173003 A1 | 7/2008 | Chen | |
| 2008/0308076 A1* | 12/2008 | Reynolds | B64D 37/00 |
| | | | 123/519 |
| 2013/0192679 A1* | 8/2013 | Ripley | F02C 7/236 |
| | | | 137/2 |
| 2017/0015557 A1 | 1/2017 | Daniello | |

* cited by examiner

US 10,883,423 B2

TWO STAGE OXYGEN REMOVAL FOR GAS TURBINE ENGINE FUEL SYSTEM

BACKGROUND

This application relates to a two stage oxygen removal system for removing gases from a fuel supply to a gas turbine engine.

Gas turbine engines are known and typically include a combustor that receives fuel, mixes the fuel with compressed air, and ignites the mixed fluids.

It is known that oxygen is often dissolved in the fuel being delivered to the combustor. As an example, on an aircraft, the fuel tank is typically vented to atmosphere. Thus, the fuel is exposed to atmospheric air and oxygen dissolves into the fuel.

It is desirable to remove the oxygen prior to it being delivered into the combustor for combustion. Oxygen in the fuel creates impurities that would be desirably reduced.

However, gas turbine engines on aircraft operate at varying speeds and thus require a wide variation in fuel delivery volume. As an example, when an aircraft is at a cruise condition, the fuel volume is relatively low. On the other hand, at takeoff, the fuel requirements are much higher.

It is known to include oxygen removal units into a fuel supply line. However, providing an oxygen removal unit that is capable of removing oxygen from the higher volume of fuel being delivered at takeoff requires a very large system. Of course, in aircraft applications, both weight and space are at a premium.

Two stage oxygen removal systems are known. However, in general, they have moved the fuel through both stages continuously when the engine is being started and when it is running.

SUMMARY

A fuel supply system has a fuel tank, a first fuel pump, and a first oxygen removal unit. The first fuel pump delivers fuel from the fuel tank into the first oxygen removal unit. A valve downstream of the first oxygen removal unit is operable to selectively deliver fuel back to the fuel tank in a bypass position or downstream to a use in a use position. A controller programmed to control the valve and the first fuel pump maintains the valve in the bypass position when an associated gas turbine engine is not operating. The controller moves the valve to the use position when the associated gas turbine engine is operating. A gas turbine engine and a method of operating a fuel supply system are also disclosed.

These and other features may be best understood from the following drawings and specification.

DETAILED DESCRIPTION

Figure 1:
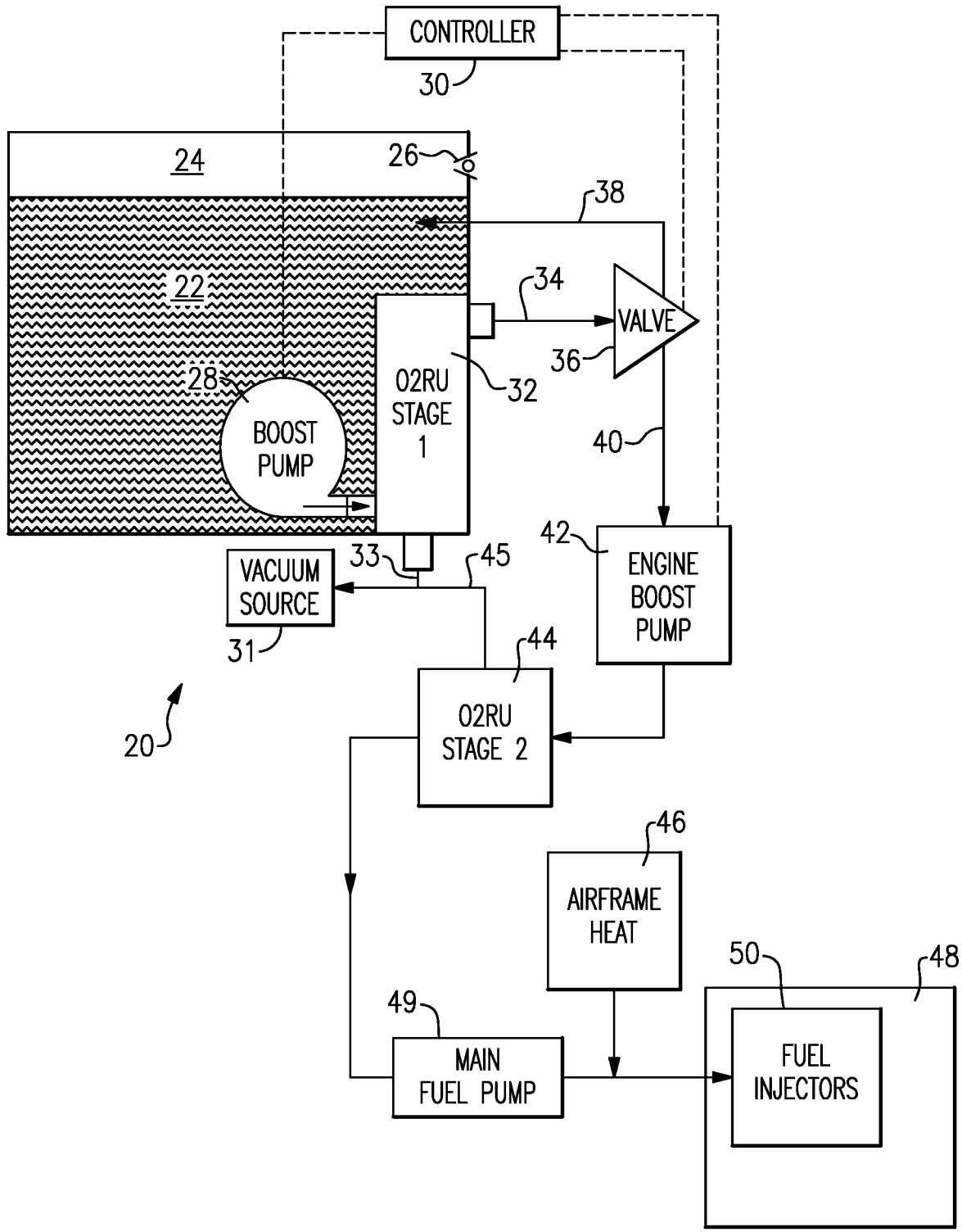
FIG. 1 schematically shows a fuel supply system for a gas turbine engine on an aircraft.

A system 20 is illustrated in FIG. 1 for supplying fuel to a gas turbine engine on an aircraft. A fuel tank 22 has fuel at vertically lower portions and air at higher portions 24. As known, a vent 26 is generally provided in the fuel tank 22.

A first pump 28 communicates with a controller 30. The first pump 28 delivers fuel through a first oxygen removal system 32. First oxygen-removal system 32 is mounted in fuel tank 22 but it could be outward. Oxygen removal systems are known and often include a plurality of tubes which provide membranes for removing oxygen from the fuel. Oxygen is removed from an outlet 33 and a vacuum source 31 removes the oxygen, such as by dumping it into the outside environment.

Downstream of the oxygen removal unit 32, the fuel enters a line 34 leading to a diverter valve 36. The diverter valve 36 is also under the control of controller 30. Controller 30 may be part of a full authority digital electronic controller (FADEC) for the engine or may be a standalone controller. The controller 30 is operable to vary a position of the diverter valve 36 such that the diverter valve 36 returns the fuel to a return line 38, or selectively delivers the line into a supply line 40. In one embodiment, the diverter is moveable between two positions, wherein it either delivers all fuel back into line 38 or all fuel back into line 40. However, it is within the scope of this disclosure that the diverter may be able to modulate the proportion of the fuel being delivered into the two lines 38 and 40.

In general, before an engine associated with the system 20 is to be started, the fuel will be delivered back into the line 38. That is, the first pump 28 will be started prior to the associated engine being started. This will allow the oxygen removal unit 32 to begin to remove oxygen from the fuel which is in the tank 22 prior to the engine being started. Once a decision is identified to start the engine, the control 30 moves valve 36 to a position supplying fuel through line 40 to an engine fuel pump 42. Engine boost pump 42 may pass fuel through a second oxygen removal unit 44 and then towards fuel injectors 50 on an engine 48. As is known, airframe heat may be added at 46 to heat the fuel, such as through a fuel/air heat exchanger. A main fuel pump 49 raises the pressure of the fuel such that it can be delivered into the injectors 50.

The oxygen removed from the second oxygen removal unit 44 passes into line 45 and is removed by a vacuum source 31.

While the valve 36, in one embodiment, may be moved between the two positions, in at least one embodiment, the valve 36 may be operable to modulate the volume being returned to the line 38 such that the "pre-removal" of oxygen within the tank 22 can proceed during lower power operation such as cruise.

Figure 2:
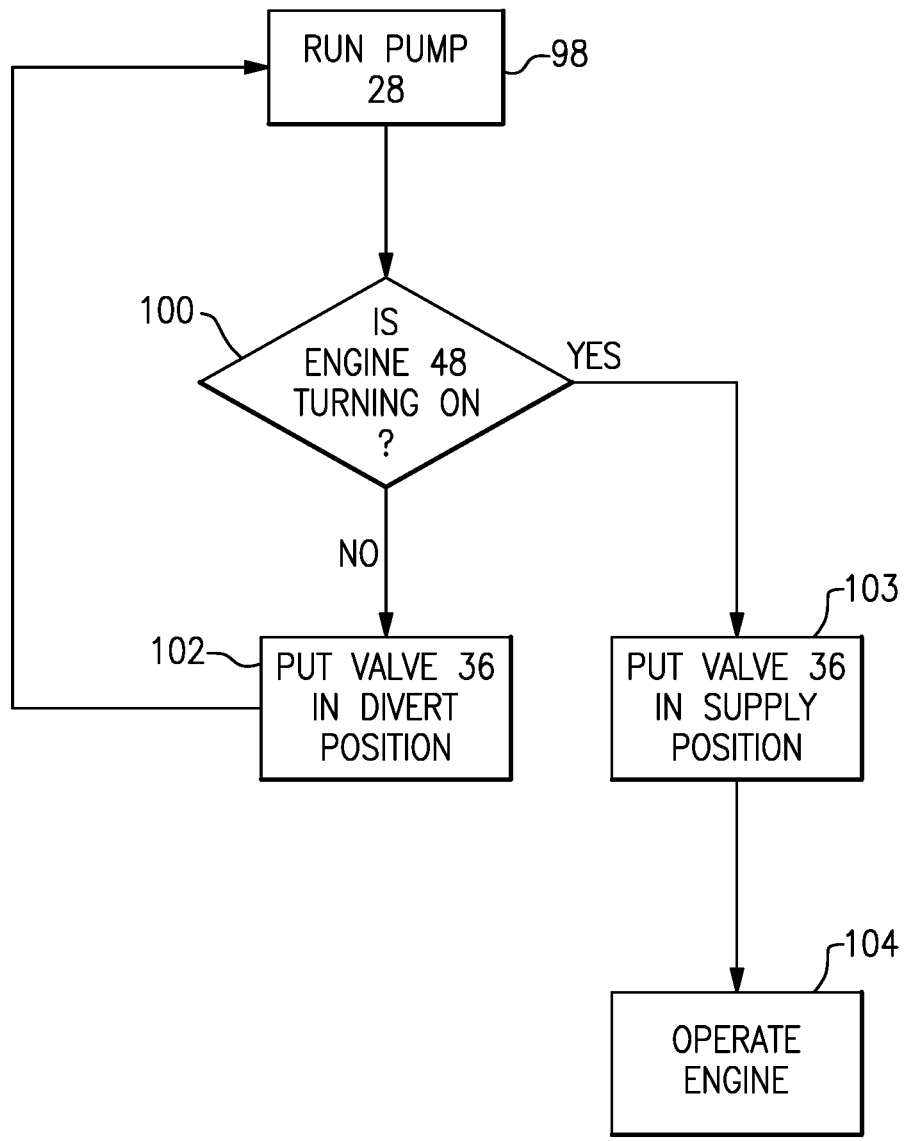
FIG. 2 is a flow chart.

As shown in FIG. 2, a flow chart of a method could be said to run the first pump 28 at a first step 98. At step 100, the question is asked if the engine is turning on or is on. If the answer is no, the valve 36 is put in a closed position wherein it returns the fuel to a line 38. This thus begins to remove oxygen from the fuel 22 prior to the engine being started such that the fuel in fuel tank 22 has less oxygen when the engine is started and is operating. In at least one embodiment, step 98 begins a period of time prior to the expected start of the engine 48.

As an example, turn-around times for commercial aircraft can be on the order of a half an hour. The step 98 can continue during this entire time. For larger aircraft, it could be longer, and up to approximately 60 minutes. In such situations, the step 98 could continue for the entire 60 minutes.

If the answer at step 100 is yes, then the valve is moved to the position delivering fuel into the supply line 40 and the engine is operated at step 104.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A fuel supply system comprising:
a fuel tank;
a first fuel pump;
a first oxygen removal unit and said first fuel pump connected to deliver fuel from said fuel tank into said first oxygen removal unit;
a valve downstream of said first oxygen removal unit, said valve being operable to selectively deliver the fuel back to said fuel tank in a bypass position, or downstream to an associated gas turbine engine in a use position, and said valve being operable to block the fuel from passing to the associated gas turbine engine in the bypass position;
a controller programmed to control said valve and said first pump, said controller maintaining said valve in said bypass position if the associated gas turbine engine is not operating, and moves said valve to said use position when the associated gas turbine engine is operating; and
wherein said controller is programmed to start said first fuel pump and to position the valve in the bypass position to deliver the fuel back to said fuel tank a period of time prior to an expected start of the associated gas turbine engine.

2. The fuel supply system as set forth in claim 1, wherein said first fuel pump is mounted within said fuel tank.

3. The fuel supply system as set forth in claim 1, wherein said valve either delivers all of the fuel back to said fuel tank or it delivers all of the fuel downstream to said associated gas turbine engine.

4. The fuel supply system as set forth in claim 1, wherein said valve modulates a portion of the fuel back to said fuel tank and delivers another portion downstream to said associated gas turbine engine.

5. The fuel supply system as set forth in claim 1, wherein the valve is connected to a second pump.

6. The fuel supply system as set forth in claim 5, wherein said second pump is connected to deliver the fuel into a second oxygen removal unit.

7. The fuel supply system as set forth in claim 1, wherein said use position delivers the fuel to fuel injectors in a combustor of the associated gas turbine engine.

8. A gas turbine engine comprising:
a combustor including fuel injectors, and a system for delivering fuel to said fuel injectors, the system including a fuel tank;
a first fuel pump;
a first oxygen removal unit and said first fuel pump connected to deliver the fuel from said fuel tank into said first oxygen removal unit;
a valve downstream of said first oxygen removal unit, said valve being operable to selectively deliver the fuel back to said fuel tank in a bypass position, or downstream to said fuel injectors in a use position and said valve being operable to block the fuel from passing to the gas turbine engine in the bypass position;
a controller programmed to control said valve and said first pump, said controller maintaining said valve in said bypass position if said gas turbine engine is not operating, and moves said valve to said use position when said gas turbine engine is operating; and
wherein said controller is programmed to start said first fuel pump and to position the valve in the bypass position to deliver the fuel back to said fuel tank a period of time prior to an expected start of the gas turbine engine.

9. The gas turbine engine as set forth in claim 8, wherein said first fuel pump is mounted within said fuel tank.

10. The gas turbine engine as set forth in claim 8, wherein the valve is connected to a second pump.

11. The gas turbine engine as set forth in claim 10, wherein said second pump is connected to deliver the fuel into a second oxygen removal unit.

12. A method of operating a fuel supply system including the steps of:
pumping fuel from a fuel tank with a first fuel pump to a first oxygen removal unit;
positioning a valve downstream of said first oxygen removal unit, and controlling said valve to selectively deliver the fuel back to said fuel tank in a bypass position, or downstream an associated gas turbine engine in a use position, and said valve being operable to block the fuel from passing to the associated gas turbine engine in the bypass position; and
maintaining said valve in said bypass position if the associated gas turbine engine is not operating, and moving said valve to said use position when the associated gas turbine engine is operating; and
starting the first fuel pump and positioning the valve in the bypass position to deliver the fuel back to said fuel tank a period of time prior to an expected start of the associated gas turbine engine.

13. The method as set forth in claim 12, wherein said valve either delivers all of the fuel back to said fuel tank or delivers all of the fuel downstream to said associated gas turbine engine.

14. The method as set forth in claim 12, wherein said valve modulates a portion of the fuel back to said tank and delivers another portion of the fuel downstream to said associated gas turbine engine.

15. The method as set forth in claim 12, wherein the valve is connected to a second pump.

16. The method as set forth in claim 15, wherein said second pump is connected to deliver the fuel into a second oxygen removal unit.

* * * * *